United States Patent [19]

Simizu et al.

[11] Patent Number: 5,612,832
[45] Date of Patent: Mar. 18, 1997

[54] CASSETTE DECK OF A CAR STEREO

[75] Inventors: Terumasa Simizu; Mutsurou Tanoue; Masaya Kano; Mitsugu Ogino; Jun Sato, all of Saitama-ken, Japan

[73] Assignee: Pioneer Electronic Corporation, Tokyo, Japan

[21] Appl. No.: 554,831

[22] Filed: Nov. 7, 1995

[30] Foreign Application Priority Data

Nov. 8, 1994 [JP] Japan ................................. 6-273871

[51] Int. Cl.$^6$ .................................................. G11B 15/18
[52] U.S. Cl. .......................... 360/73.04; 360/71; 455/345
[58] Field of Search .................................. 360/71, 73.04, 360/74.1; 455/345, 346

[56] References Cited

U.S. PATENT DOCUMENTS

| | | | |
|---|---|---|---|
| 4,214,283 | 7/1980 | Fushimi et al. | 360/71 |
| 4,800,449 | 1/1989 | Yamasaki | 360/71 |
| 5,489,071 | 2/1996 | Tarpley, Jr. et al. | 360/74.2 X |

*Primary Examiner*—Aristotelis Psitos
*Assistant Examiner*—James T. Wilson
*Attorney, Agent, or Firm*—Nikaido, Marmelstein, Murray & Oram LLP

[57] ABSTRACT

A cassette deck of a car stereo has at least one capstan and a motor for driving the capstan. An accessory switch is provided in a car provided with the car stereo. A accessory switch detector is provided for detecting closing of the accessory switch. A cassette detector is provided for detecting setting of a cassette to the cassette deck. In response to detection of closing of the accessory switch, and setting of the cassette, the motor is operated for rotating the capstan for a predetermined time.

4 Claims, 7 Drawing Sheets

CASSETTE DECK OF A CAR STEREO

BACKGROUND OF THE INVENTION

The present invention relates to a cassette deck provided in a car stereo, and more particularly to a cassette deck where a tape in the cassette is prevented from becoming entangled.

The cassette deck mounted in an automobile must be designed with regard to specific environmental conditions such as humidity, vibration and dust and to operability of the deck.

Referring to FIG. 7, in a cassette 1, a tape 2 wound on a hub is guided by a guide pin 3a and a guide roller 4a and extends across a pressure pad 8. The tape 1 is further guided by a guide roller 4b and a guide pin 3b and wound on a take-up hub. The cassette 1 is inserted in a cassette deck in a direction shown by an arrow c, so that the tape 2 is set between a pinch roller 6b and a capstan 5a and between a pinch roller 6b and a capstan 5b of the cassette deck. For playing the cassette 1, a head 7 of the cassette deck is moved in a direction a so as to abut the tape 2 against the pressure pad 8. When thus playing the tape 2, or when reeling the tape 2 in a direction shown by an arrow in FIG. 7, the pinch roller 6b is moved toward the capstan 5b to hold the tape therebetween. The tape is driven while thus in contact with the pinch roller 6b and the capstan 5b both of which rotate with the running of the tape 2. When the tape 2 is rewound, that is, reeled in the opposite direction, the tape 2 is held by the pinch roller 6a and the capstan 5a.

In order to retrieve the cassette 1, the head 7 is retracted in a direction b and the cassette is ejected in a direction d.

Some of the cassette decks are provided with a cassette deck detecting switch which is closed upon insertion of the cassette. Thus the cassette deck is operated to play the cassette as soon as the cassette is set.

While the cassette is played, the driver of the automobile may turn on other devices such as a CD player without first taking out the cassette, or the ignition switch is turned off thereby cutting off the power from the battery to the cassette deck. As a result, the cassette is left inserted in the deck.

As shown in FIG. 8, a part of the tape 2 is held between the pinch roller 6b and the capstan 5b, or between the pinch roller 6a and the capstan 5a as the case may be. If the cassette is kept in the cassette deck for too long in such a condition, the tape 2 may adhere on the contacting surface of the pinch roller 6b. Consequently, when the cassette 1 is driven the next time, the tape 2 may be wound on the pinch roller 6b, unabled to be reeled. The tape 2 may otherwise be torn. Moreover, the pinch roller 6b may be deformed by the pressure of the capstan 5b, so that wow and flutter occur until the roller 6b retrieves its normal shape.

In order to prevent such troubles, a key-off release mechanism for retracting the pinch roller to its initial position is provided in some types of the cassette deck, hence preventing the tape from being stuck. However the manufacturing cost of the cassette deck is high.

SUMMARY OF THE INVENTION

An object of the present invention is to provide a cassette deck where the tape can be reliably reeled without raising the manufacturing cost.

According to the present invention, there is provided a cassette deck of a car stereo having a removable panel having a plurality of operation buttons for operating the car stereo and attached to a body of the car stereo, the cassette deck having at least one capstan and a motor for driving the capstan, comprising, an accessory switch detector for detecting closing of an accessory switch of a car provided with the car stereo, a panel detector for detecting attachment of the removable panel, a cassette detector for detecting setting of a cassette to the car stereo.

Control means is provided to respond to detection of closing of the accessory switch, attachment of the removable panel, and setting of the cassette for operating the motor for rotating the capstan for a predetermined time.

In another aspect of the present invention, there is provided a cassette deck of a car stereo, the cassette deck having at least one capstan and a motor for driving the capstan, comprising, an accessory switch detector for detecting closing of an accessory switch of a car provided with the car stereo, a cassette detector for detecting setting of a cassette to the car stereo.

Control means is provided to respond to detection of closing of the accessory switch, and setting of the cassette for operating the motor for rotating the capstan for a predetermined time.

The other objects and features of this invention will become understood from the following description with reference to the accompanying drawings.

DETAILED DESCRIPTION OF THE PREFERRED EMBODIMENTS

Figure 7:
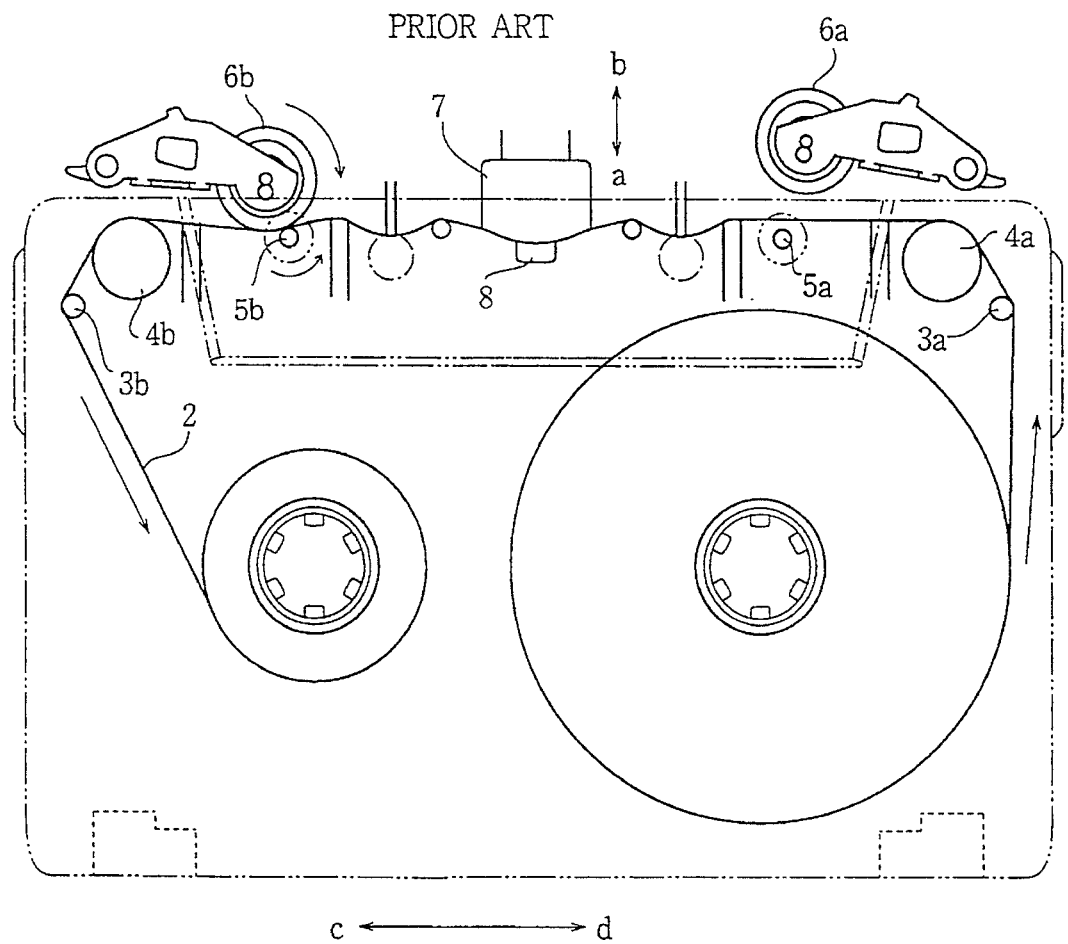
FIG. 7 is a plan view of a cassette set in a conventional cassette deck.
Figure 8:
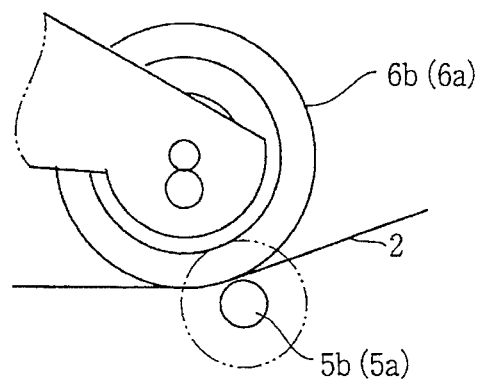
FIG. 8 is an enlarged plan view of a pinch roller and a capstan of the FIG. 7.

The present invention is applied to a cassette deck of a car stereo mounted in an automobile, and having a similar constructions as that shown in FIG. 7.

Figure 1:
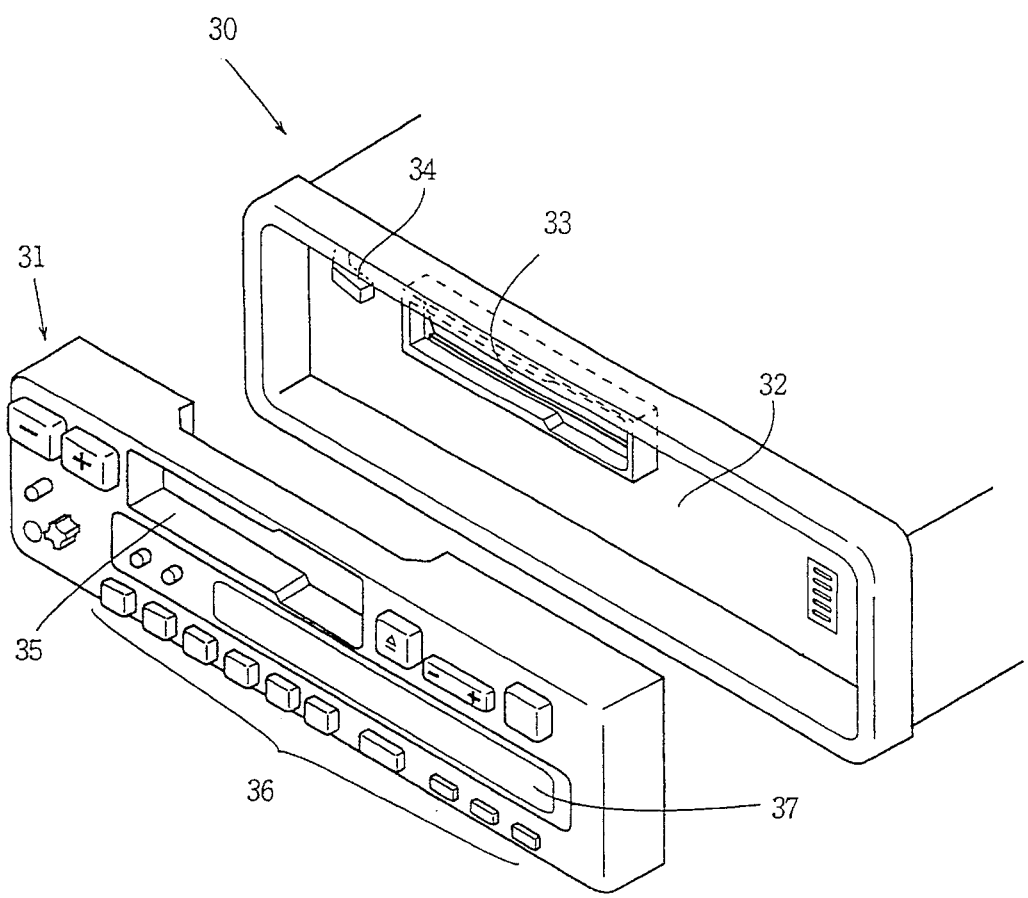
FIG. 1a is a perspective view of a car stereo to which the present invention is applied.
FIG. 1b is a diagram showing a circuitry of a cassette deck of the present invention for controlling the operation of the cassette.
Figure 1:
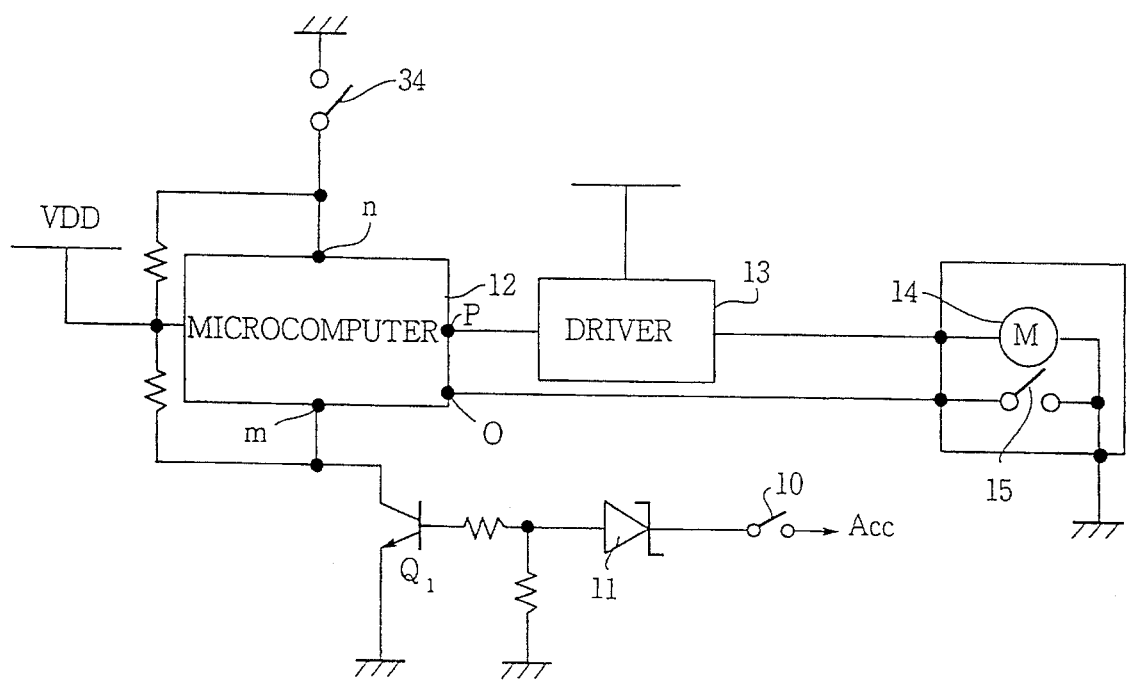

Referring to FIG. 1a showing a car stereo, the car stereo comprises a car stereo body 30 and a removable panel 31 attached to the body 30. The body 30 has recessed panel 32 mounted at the front thereof. The panel 32 has a cassette opening 33. A panel detector switch 34 is provided on the panel 32 to detect the attachment of the panel 31 on the body 30. The panel 31 has a cassette opening 35 which coincides with the cassette opening 33 of the body 30 and various operation keys 36. A display 37 is disposed on the panel 31 so as to indicate information such as current time and the received frequency of the stereo.

Referring to FIG. 1b, a control system according to the present invention comprises an accessory switch 10 which is closed when an ignition key of the automobile is at an accessory position. In an automobile without an accessory switch, the ignition key thereof is used, instead of the accessory switch. The accessory switch 10 is connected to a base of a transistor Q1 thorough a voltage regulation diode 11. The collector of the transistor Q1 is connected to a microcomputer 12 supplied with power $V_{DD}$ at an accessory switch sensing port m. The panel detector switch 34 is connected to the microcomputer 12 through a panel sensing port n. The microcomputer 12 further has a cassette sensing port o which is connected to a cassette detector switch 15. The cassette detector switch 15 is closed when the cassette is set in the cassette deck at the position shown in FIG. 7.

An output port p of the microcomputer 12 is connected to a motor 14 for driving the capstans 5a and 5b shown in FIG. 7 through a driver 13.

Figure 3:
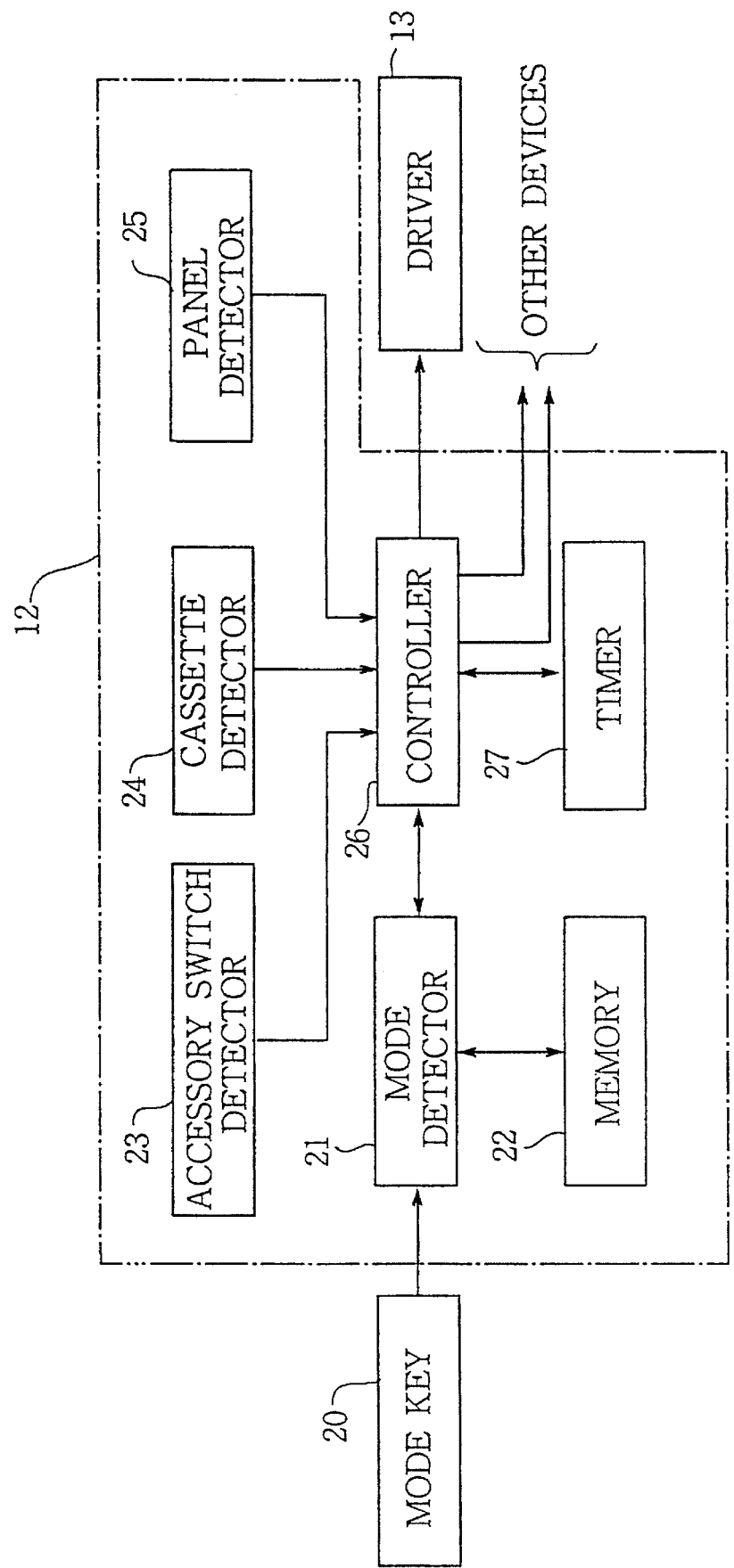
FIG. 3 is a block diagram of a microcomputer provided in the circuitry of FIG. 1b.

Referring to FIG. 3 showing the microcomputer 12 in detail, the microcomputer 12 is applied with a signal from a mode key 20 mounted on the panel and operated when selecting one of the devices of the car stereo, such as the cassette deck and CD player. The signal is applied to a mode detector 21 where the selected mode is determined. The determined mode is stored in a memory 22 so that when the accessory switch 10 is opened and again closed after some time, the car stereo automatically resumes its operating mode stored in the memory 22.

The output signal of the mode detector 21 is further fed to a controller 26 which controls the operation of the driver 13 of the cassette deck and the operation of other devices. The controller 26 is further fed with signals from an accessory switch detector 23, cassette detector 24 and panel detector 25 which are connected to the accessory switch 10, cassette detector switch 15 and the panel detector switch 34 shown in FIG. 1b, respectively. Namely, when the accessory switch 10, cassette detector switch 15 and the panel detector switch 34 are closed, the levels at the corresponding ports of the microcomputer 12, that is, each of the accessory switch sensing port m, cassette sensing port o and the panel sensing port n becomes low. The controller 26 operates the driver 13 and other devices in the car stereo in accordance with the conditions of the switches 10, 15 and 34. If the cassette detector switch 15 is closed, the reproduction of the tape is performed.

The controller 26 further operates a timer 27 to set a predetermined period of time T for actuating the driver 13. When the cassette deck is in such a state that the accessory switch 10 or an ignition key has been opened while the cassette is left in the cassette deck, the controller 26 operates the driver 13 to drive the motor 14 for the period of time T at the re-closing of the accessory switch 10.

Figure 4:
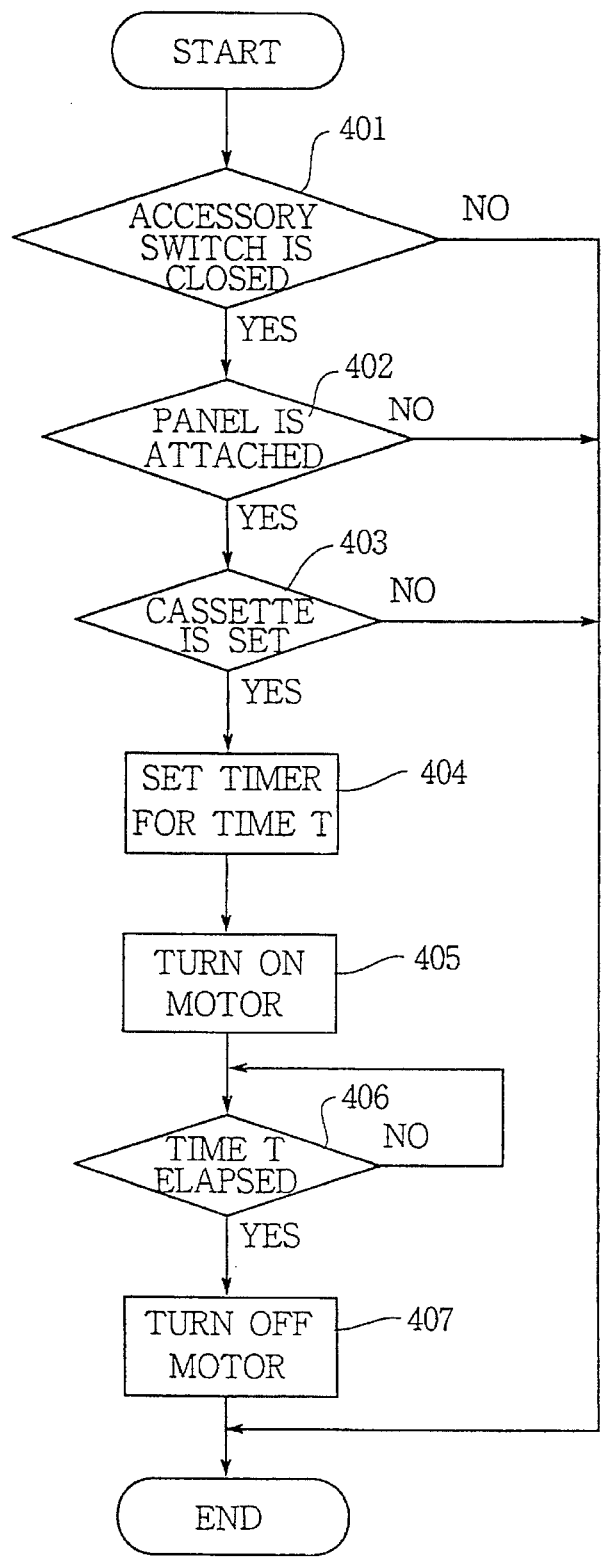
FIG. 4 is a flowchart showing the operation of the cassette deck of the present invention.

The operation of the cassette deck is described hereinafter with reference to FIG. 4.

Figure 2:
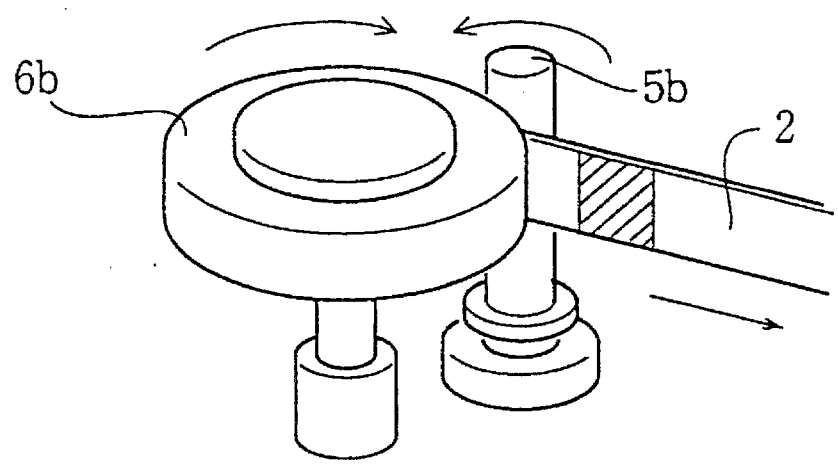
FIG. 2 is a perspective view of a pinch roller and a capstan of the cassette for explaining the operation thereof.

When a cassette is left in the cassette deck, the cassette detector 24 detects the closing of the cassette switch 15. When the operating panel is attached to the car stereo so as to be able to operate the car stereo, the panel detector 25 detects the closing of the panel detector switch 34. Under such a condition, when the ignition key is turned on so that the accessory switch detector 23 detects that the accessory switch 10 is closed, the program proceeds through steps 401 to 403 and to a step 404 where the timer 27 is set to a predetermined time T, for example 100 msec. Accordingly, the controller 26 of the microcomputer 12 applies a control current to the driver 13, thereby to drive the motor 14 for the time T. As a result, the capstan 5b is rotated one fourth of a rotation at a step 405. As shown in FIG. 2, a portion of the tape 2 indicated by hatchings which had been in contact with the pinch roller 6b and hence liable to adhere on the roller 6b advances a predetermined distance so as to be released from the pinch roller 6b. After the time T is elapsed (step 406), the motor 14 is stopped at a step 407.

Figure 5:
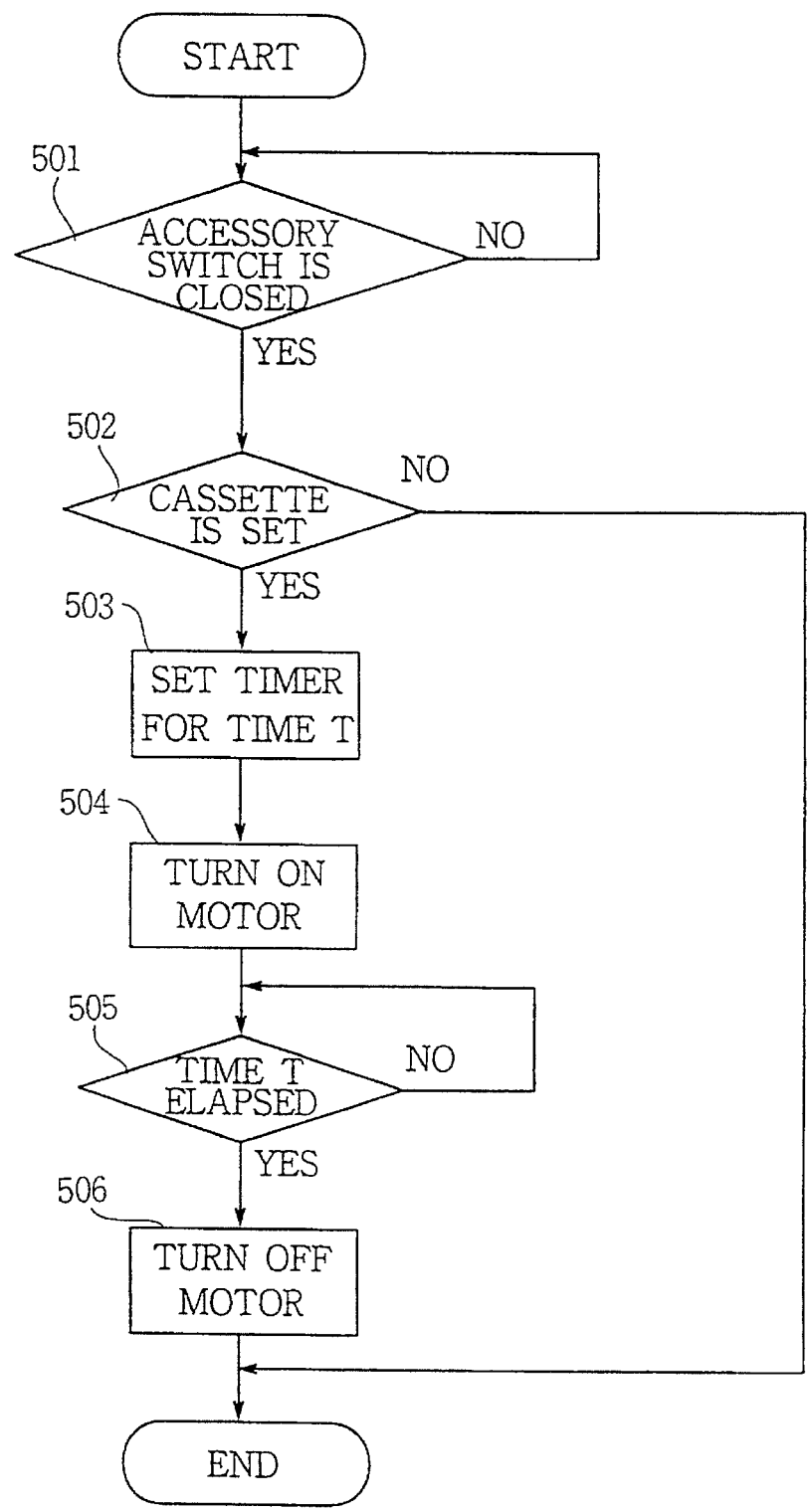
FIGS. 5 and 6 are flowcharts showing modifications of the operation of FIG. 4.

As shown in FIG. 5, the operation may be modified to determine at a step 501 that the accessory switch 10 is closed, and at a step 502 that the cassette switch 15 is closed before driving the motor 14 for the time T. Namely, the attaching of the panel is not considered. Steps 503 to 506 are the same as the steps 404 to 407 in FIG. 4.

Figure 6:
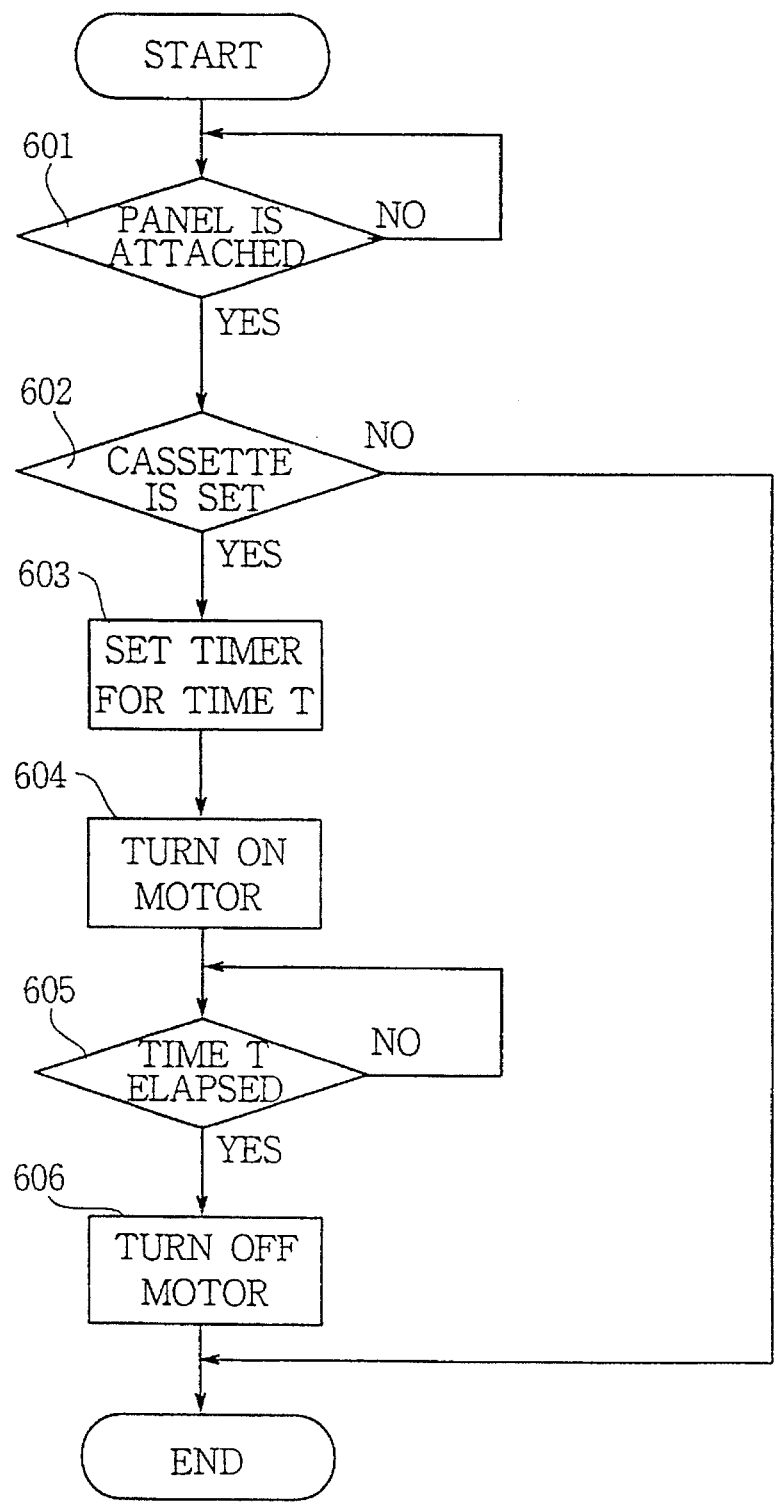

FIG. 6 shows another modification where the attaching of the panel (step 601) when the cassette is inside the cassette deck (step 602) is the prerequisite for driving the motor 14 for the time T. Steps 603 to 606 are the same as the steps 404 to 407 in FIG. 4.

The period of time T for driving the motor 13 need not be limited to 100 msec as long as the adhering portion of the tape 2 is displaced from the surface of the pinch roller and hence may be shorter or longer than 100 msec.

Thus, although the power to the cassette deck is cut off so that the cassette is left inside the deck, upon closing of the accessory switch or the attachment of the removable panel of the cassette deck, the tape is advanced a small distance. Hence the tape is prevented from adhering on the pinch roller so that the tangling up or the tear of the tape is avoided the next time the tape is reeled. Furthermore, the pinch roller is prevented from temporarily deforming by the pressure of the capstan, so that the wow and flutter which are liable to occur until the pinch roller resumes its normal shape are prevented. Since the present invention involves only a simple mechanism, the object is attained without increasing the manufacturing cost.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A cassette deck of a car stereo having a removable panel having a plurality of operation buttons for operating the car stereo and attached to a body of the car stereo, the cassette deck having at least one capstan and a motor for driving the capstan, comprising:

an accessory switch detector for detecting closing of an accessory switch of a car provided with the car stereo;

a panel detector for detecting attachment of the removable panel;

a cassette detector for detecting setting of a cassette to the cassette deck;

driving control means responsive to detection of closing of the accessory switch, attachment of the removable panel, and setting of the cassette for operating the motor for rotating the capstan for a predetermined time.

2. A cassette deck of a car stereo, the cassette deck having at least one capstan and a motor for driving the capstan, comprising:

an accessory switch detector for detecting closing of an accessory switch of a car provided with the car stereo;

a cassette detector for detecting setting of a cassette to the cassette deck;

driving control means responsive to detection of closing of the accessory switch, and setting of the cassette for operating the motor for rotating the capstan for a predetermined time.

3. A cassette deck of a car stereo having a removable panel having a plurality of operation buttons for operating the car stereo and attached to a body of the car stereo, the cassette deck having at least one capstan and a motor for driving the capstan, comprising:

a panel detector for detecting attachment of the removable panel;

a cassette detector for detecting setting of a cassette to the car stereo;

driving control means responsive to detection of attachment of the removable panel, and setting of the cassette for operating the motor for rotating the capstan for a predetermined time.

4. A cassette deck according to claim 2 wherein a timer is provided for setting the predetermined time.

* * * * *